Oct. 24, 1961  J. BOCHAN  3,005,529

PNEUMATICALLY ACTUATED CLUTCHING MECHANISM

Filed June 23, 1960

INVENTOR.
JOHN BOCHAN
BY Derek P Lawrence
HIS ATTORNEY

United States Patent Office 3,005,529
Patented Oct. 24, 1961

3,005,529
PNEUMATICALLY ACTUATED CLUTCHING MECHANISM
John Bochan, Louisville, Ky., assignor to General Electric Company, a corporation of New York
Filed June 23, 1960, Ser. No. 38,340
3 Claims. (Cl. 192—88)

This invention relates to clutching mechanisms, and more particularly to a clutching mechanism of the pneumatically actuated type.

It is an object of my invention to provide a clutching mechanism wherein the clutching surface itself forms part of the seal for the enclosed space into which gas is introduced to operate the mechanism.

A further object of my invention is to provide a pneumatically operated clutch structure wherein a relatively high speed rotation may be transmitted or else centrifugally operated means may be made effective, at a predetermined lower speed, to provide that lower speed.

According to my invention, I provide a pneumatically actuated clutching mechanism in which first and second coaxial relatively rotatable members are respectively provided with axially displaced surfaces; in this way, an annular chamber is formed between the surfaces of the two members. One end of the chamber is closed by sections of the two members which are in bearing relation to each other. The first one of the members includes a part which is secured to the rest of that first member in axially movable but non-rotatable relation, the part being positioned between the axially displaced surfaces. This part has an annular clutching band which is adjacent and facing the second member surface; upon axial movement of the part, the band moves into tight engagement with the second member surface so as to clutch the members together and so as to form at least part of the closure of the other end of the chamber. In addition, the part has a back portion which faces toward but is spaced from the surface of the first member so that it is, in effect, within the chamber and subject to any pressures that may occur therein. To complete the chamber closure, I provide an annular sealing strip of flexible material which is secured at one end to the axially movable part and at its other end to the remainder of the first member so as to complete the closing of the other end of the chamber.

One of the two members has a passage extending from the chamber thus formed, and the passage in turn is adapted to be connected to a source of gas under pressure. When this connection is made, the clutching band moves against the second member surface with a force which increases as the gas pressure increases. Therefore, as the force of engagement of the second member surface and the clutching band increases, the effectiveness of the two as a seal preventing escape of the gas also increases. As a result, with the structure, a gas pressure which is sufficient to provide a good clutching action also is inherently sufficient to cause a good sealing action to be provided.

In addition, one of the two members also has an exhaust passage extending from the chamber and adapted to be connected to atmosphere. The openings to this exhaust passage usually are covered by weight means movably positioned within the chamber and biased to a position where they close the passage. Under the influence of centrifugal force, these weight means move at a predetermined speed of rotation to a second position in which the exhaust passage is uncovered. Thus, when the exhaust passage is open to atmosphere, there is a rotational speed transmitted by the clutching mechanism which is limited in accordance with the speed at which the weight means uncover the exhaust passage. If the exhaust passage is closed, by separate valve means for instance, then a higher speed, independent of the weight means, is provided.

The subject matter which constitutes my invention is particularly pointed out and distinctly claimed in the concluding portion of this specification. The invention itself, however, both as to organization and method of operation, together with further objects and advantages thereof, may best be understood by reference to the following description taken in conjunction with the accompanying drawing.

Figure 1:
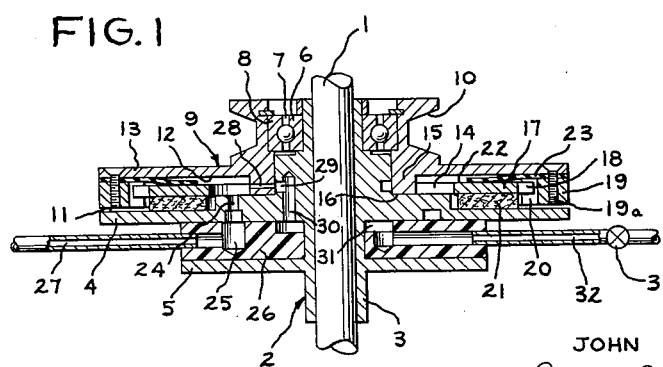
FIGURE 1 is a side elevational cross-sectional view of a first embodiment of my improved clutching mechanism.

Referring now to FIGURE 1 of the drawing, there is shown a shaft 1 on which a member, generally indicated at 2, is rigidly secured. Member 2 includes a sleeve portion 3 which forms a means for securing it on the shaft 1, a radially extending section 4, and a second radially extending section 5. Sleeve part 3 may be arranged to support the inner race 6 of a ball bearing 7 having an outer race 8. A second member, generally indicated by the numeral 9, is secured to race 8, and is thus both coaxial and rotatable relative to the first member 2. Member 9 may be provided with any suitable means for transmitting power such as, for instance as shown, a pulley groove 10 in which a belt may be inserted so as to couple the member 9 to another member which is either driving or to be driven.

Section 4 of member 2 has a surface 11 which faces toward the surface 12 of radially extending section 13 on member 9. Surfaces 11 and 12 are axially spaced and thus form between them an annular chamber 14. The inner end of the annular chamber is closed by a section 15 of member 9 which is arranged to bear on the raised inner end surface 16 of section 4. With the bearing 7 accepting the major part of the thrust and radial loads between the two members 2 and 9, it will be understood that portion 15 and surface 16 may be formed so as to provide in effect a rotating seal without having to accept any substantial part of the load.

An annular part 17 is provided with splines 18 on its outer periphery. A flange 19 secured at the end part 13 of member 9 by fasteners 19a has inwardly extending splines 20 which mate with splines 18 so that in effect part 17 is a component of member 9, secured to the remainder of that member in non-rotatable but axially movable relationship. Part 17 carries a clutching band 21 which faces against surface 11 and is preferably closely adjacent or lightly touching surface 11 when at its greatest distance therefrom. The back surface 22 of part 17, that is, the surface removed from the clutching surface, is positioned within the chamber 14 facing toward surface 12 in spaced relation thereto.

An annular flap 23 of resilient material is secured at its radially outer end between section 13 and flange 19 of member 9, and at its radially inner end is secured to the back 22 of member 17. In this manner, it will readily be seen that the flap 23 provides a closure preventing escape of gas from within chamber 14 through the slightly open path represented by the mating splines 18 and 20. This flap represents part of the closure of the outer end of chamber 14. The remainder of the closure of the chamber is provided, in effect, by the engagement of the clutching band 21 with surface 11. In other words, when the pressure within chamber 14 is great enough to clutch band 21 to surface 11 tightly enough so that the members 9 and 2 rotate together, then a substantially complete seal preventing leakage of air is provided.

In order to permit the introduction of air or other gas into chamber 14, a passageway 24 is provided extending from the chamber through section 4 of member 2 and terminating in a recess 24a which communicates with a passageway 25 provided in a disk-shaped member 26. Member 26 is held within the U-shaped recess formed by the sections 4 and 5 of member 2. Where a clutching operation is to be performed, that is, where both members 2 and 9 are rotatable, it will be understood that member 26 is held in stationary position within the rotating member 2. With this in mind, it will be recognized that member 26 is preferably formed of a suitable material with low sliding friction such as, for instance, nylon so that there will be relatively little room for leakage between the stationary part 26 and the sections 4 and 5 of moving part 2.

However, of course, where the structure is to be used as a brake (which is also, in the broad sense, a clutching function), then the member 2 may be used as the stationary member for braking the motion of member 9. In such a case, it will be obvious that there will be no relative motion between member 2 and the member 26.

Passageway 25 communicates with tube 27 which is adapted to be connected to a source (not shown) of compressed gas, generally air, so that when so desired air under pressure may be furnished through tube 27 and passageway 25 into the passageway 24 and the chamber 14.

As a preferred addition to my clutch structure, I provide one or more outlet passages 28 from chamber 14. These outlet passages lead to an annular recess 29 in member 2 which connects through a passage 30 with an annular recess 31 in member 26. Recess 31 in turn communicates with an outlet tube or passageway 32 having suitable control means such as a valve schematically shown at 33 provided therein for either blocking flow through tube 32 or permitting such flow. It will be apparent that when flow is permitted through tube 32 by valve 33, there will be no pressure build up of air within chamber 14 since the air will escape through passageway 28. When, however, valve 33 is closed, there is no exit for air from chamber 14 (other than for the small amount that can leak through the rotating seals).

Thus, when valve 33 is closed, the pressure within chamber 14 starts to build up since there is no ready exit for the air entering the chamber. The increase in pressure forces the part 17 firmly toward surface 11 since the pressure acts primarily on the back surface 22 of part 17, the other side being contiguous to surface 11 and therefore not as susceptible to pressure. Thus, the pressure build-up within chamber 14 clutches band 21 firmly against surface 11. This has the dual result that members 9 and 2 are then clutched to rotate together (or to be stationary together in the case of a brake) and that a substantially complete seal for the air is provided by the engagement of clutching band 21 with surface 11.

It will be seen from the foregoing that by my invention I provide an improved pneumatic clutching-type mechanism, that is, a mechanism that may be used for either clutching or braking, wherein the clutching surfaces actually form a seal providing part of the closure for the space within which the pneumatic pressure is provided. This eliminates the need for a special separate pneumatic structure and thereby simplifies the structure and permits its more economical manufacture.

Figure 2:
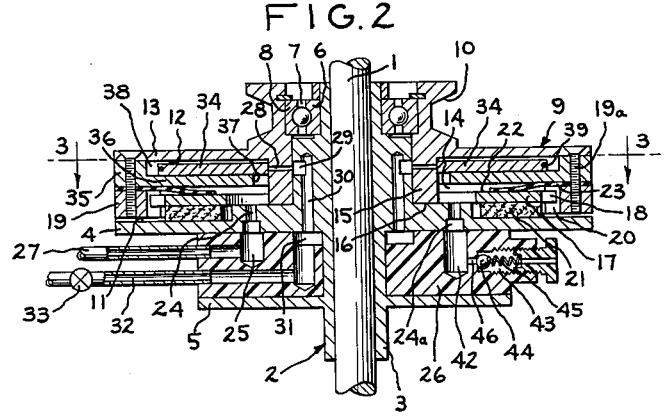
FIGURE 2 is a side elevational cross-sectional view of a second embodiment of my improved clutching mechanism.
Figure 3:
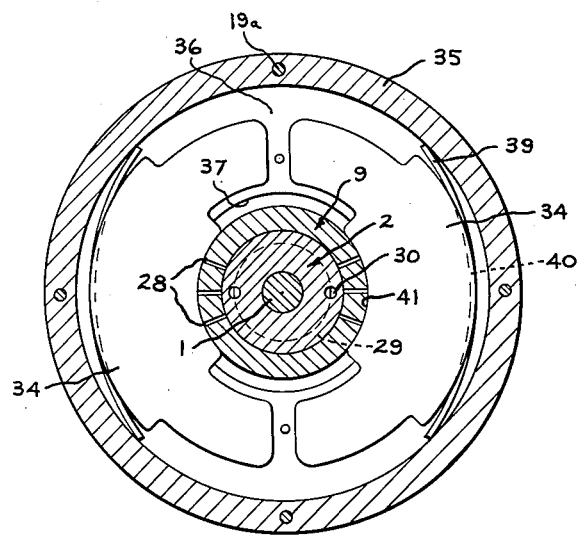
FIGURE 3 is a view along line 3—3 in FIGURE 2.

Referring now to FIGURES 2 and 3 there is shown a second embodiment of my invention in which the clutch is formed to be able to provide two different output speeds from a constant speed input source. Parts which are the same as in FIGURE 1 are shown by like numerals. In the structure of FIGURES 2 and 3, the chamber 14 is made somewhat larger so as to accommodate a suitable number of centrifugally operated members 34 which in the present case, as may best be seen in FIGURE 3, are two in number. A simple means of providing for this enlargement of chamber 14 is to provide, in addition to the flange member 19, a second flange member 35 secured by fasteners 19a to the outer end of section 13 of the member 9. Portion 35 has an inwardly extending part 36 which terminates short of portion 15, as shown at 37, so that there is communication between the main part of the chamber 14 and the smaller section 38 in which the centrifugally operable members 34 are positioned. The inwardly extending part 36 of flange member 35 causes centrifugally actuated members 34 to be retained against undesirable axial movement without, however, impairing the radial movement which is vital to their operation.

Each of the members 34 is biased radially inward by a spring member 39. Each spring 39, at its center, is seated in a groove 40 in the outer surface of a member 34 and at its ends bears against the inner surface of flange part 35. It will be seen that with this construction each spring 39 exerts a force on a member 34 pushing it radially inwardly. The inner surface 41 of each member 34 is curved so as to constitute a closure for the several exhaust openings 28 previously described in connection with FIGURE 1. Thus, under normal circumstances, spring 39 biases member 34 inwardly so that surface 41 seats against passageways 28 and the outlet passage from chamber 14 is thus blocked. However, it will readily be recognized, in view of the fact that members 34 form part of the rotatable member 9, that at a certain speed of rotation of member 9, the centrifugal force being exerted radially outwardly will overcome the force of the spring 39 and the members 34 will move outwardly away from passageways 28 so as to uncover these passageways. At this point the exhaust passageways from chamber 14 are opened and the air can escape through the previously described path including recess 29, passageway 30, recess 31 and tube 32 (assuming valve 33 to be open).

With this structure, then, if a high speed of operation of the clutch is desired from the constant speed source the valve 33 is closed and pneumatic pressure is provided through tube 27 as described in connection with FIGURE 1. This pneumatic pressure builds up within chamber 14 and forces clutching band 21 against surface 11 thereby having the dual effect of clutching members 2 and 9 together and of sealing chamber 14. The two members will thus be clutched together and therefore the member 9 will be caused to rotate with the member 2. When a certain predetermined speed is reached, the centrifugal members 34 will move outwardly by centrifugal force away from passages 28. However, since at this time valve 33 is closed, the movement of the centrifugal members has no effect, and the pressure within chamber 14 remains high enough to clutch band 21 to surface 11 to provide the full speed of member 2.

If, however, a predetermined lower speed is desired, valve 33 is opened and the pneumatic pressure is applied through tube 27 into chamber 14. As before, the increase in pressure causes the clutching band 21 to engage surface 11 and the speed starts to build up. At a predetermined speed, lower than the full speed, the members 34 move away from passages 28 and allow air to escape through those passages and out through tube 32. As a result of this the pressure in chamber 14 decreases to the point where there is increased slippage between clutch band 21 and surface 11. Because of this increased slippage the speed starts to decrease; as soon as this occurs, the decrease in speed causes the centrifugal weight 34 to move back into position so that there will be a small speed increase due to the fact that once again the pressure will start to build up within chamber 14 to cause a firmer clutching together of band 21 and surface 11, i.e., less slippage. This cyclic action will continue, and will result in a substantially constant speed which is substantially lower than the full speed provided when valve 33 was closed.

It will, of course, be recognized that suitable means may, if so desired, be provided to limit the pressure in chamber 14. In this connection, there is shown in member 26 a second passageway 42 which is also in communication with recess 24a. Passage 42 leads to a pressure-responsive valve structure generally indicated at 43 in which, for purposes of illustration, there is shown a ball valve member 44 biased by a spring 45 against an opening 46. When the pressure within passageway 42 rises to a sufficient level it forces the ball valve 44 away from opening 46 to permit the escape of air. Thus, a relatively constant air pressure may be maintained within the chamber 14 at the high speed level as well as at the low speed level by providing the valve structure 43 which limits the maximum pneumatic pressure which may be provided within chamber 14.

It will be seen from the description of the structure of FIGURES 2 and 3 that, in addition to the simplified pneumatic structure utilizing the clutching surfaces themselves as sealing means for the enclosed space under pneumatic pressure, my invention provides an improved structure wherein centrifugal force is utilized to control escape of air from the chamber 14 thereby to permit the selective provision of a second lower speed.

While in accordance with the patent statutes I have described what at present are believed to be the preferred embodiments of my invention, it will be obvious to those skilled in the art that various changes and modifications may be made therein without departing from the invention, and I therefore aim in the appended claims to cover all such changes and modifications that fall within the true spirit and scope of my invention.

What I claim as new and desire to secure by Letters Patent of the United States is:

1. A pneumatically actuated clutching mechanism comprising: first and second coaxial relatively rotatable members respectively having axially displaced surfaces forming an annular chamber between said surfaces, said members respectively having sections in sealing relation to each other closing one end of said chamber, said first member including a part secured between said surfaces in axially movable non-rotatable relation to the remainder of said first member, said part including an annular clutching band axially movable into tight engagement with said second member surface thereby to clutch said members together and to seal part of the other end of said chamber, said part further having a back portion facing toward and spaced from said first member surface so as to be subjected to the pressure within said chamber, an annular sealing strip of flexible material secured at one end to said part and at its other end to said remainder of said first member thereby to close the remainder of said other end of said chamber, one of said members having an inlet passage extending from said chamber and adapted to be connected to a source of gas under pressure whereby said clutching band is movable against said second member surface with increasing force as the gas pressure in said chamber increases, one of said members having exhaust passage means extending therethrough from said chamber and adapted to be connected to atmosphere, weight means positioned within said chamber so as to be movable therewithin, said weight means being formed to close said exhaust passage means in one position thereof, spring means biasing said weight means to said one position, said weight means being movable under the influence of centrifugal force at a predetermined speed of rotation to a second position in which said exhaust passage means is uncovered, whereby the rotational speed transmitted by such clutching mechanism may be limited in accordance with the speed at which said weight means uncovers said exhaust passage means.

2. The apparatus defined in claim 1 wherein means are provided for closing said exhaust passage independently of said weight means whereby a relatively high speed is provided when said closing means closes said passage and a relatively low speed is provided by said weight means when said exhaust passage is opened.

3. The apparatus defined in claim 1 wherein said weight means comprise a pair of weights diametrically oppositely positioned and radially movable in response to centrifugal force, said exhaust passage means being formed as a plurality of exhaust passages at the inner end of said chamber, said spring means biasing said weights radially inwardly against said exhaust passages thereby to close them, said weights moving radially outwardly against said spring means at said predetermined speed so as to uncover said exhaust passages.

References Cited in the file of this patent

UNITED STATES PATENTS

| | | |
|---|---|---|
| Re. 24,905 | Giffen | Dec. 13, 1960 |
| 369,807 | Noyes | Sept. 13, 1887 |
| 2,621,768 | Cardwell et al. | Dec. 16, 1952 |
| 2,876,881 | Parrett | Mar. 10, 1959 |

FOREIGN PATENTS

| | | |
|---|---|---|
| 41,494 | France | Nov. 3, 1932 |
| | (1st add. of 727,087) | |